W. D. HUGHS.
GEARING FOR MOTOR VEHICLES.
APPLICATION FILED MAR. 15, 1911.

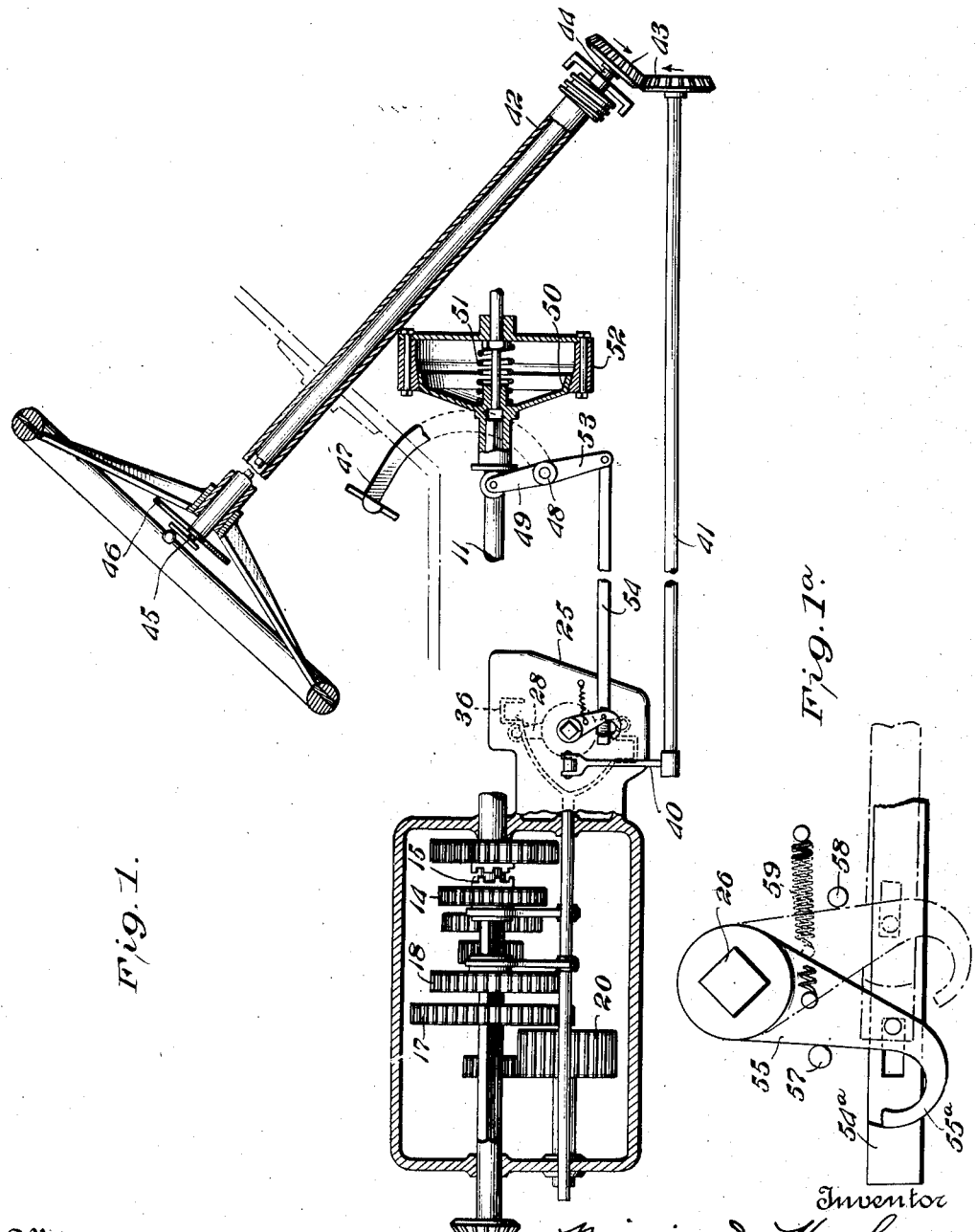

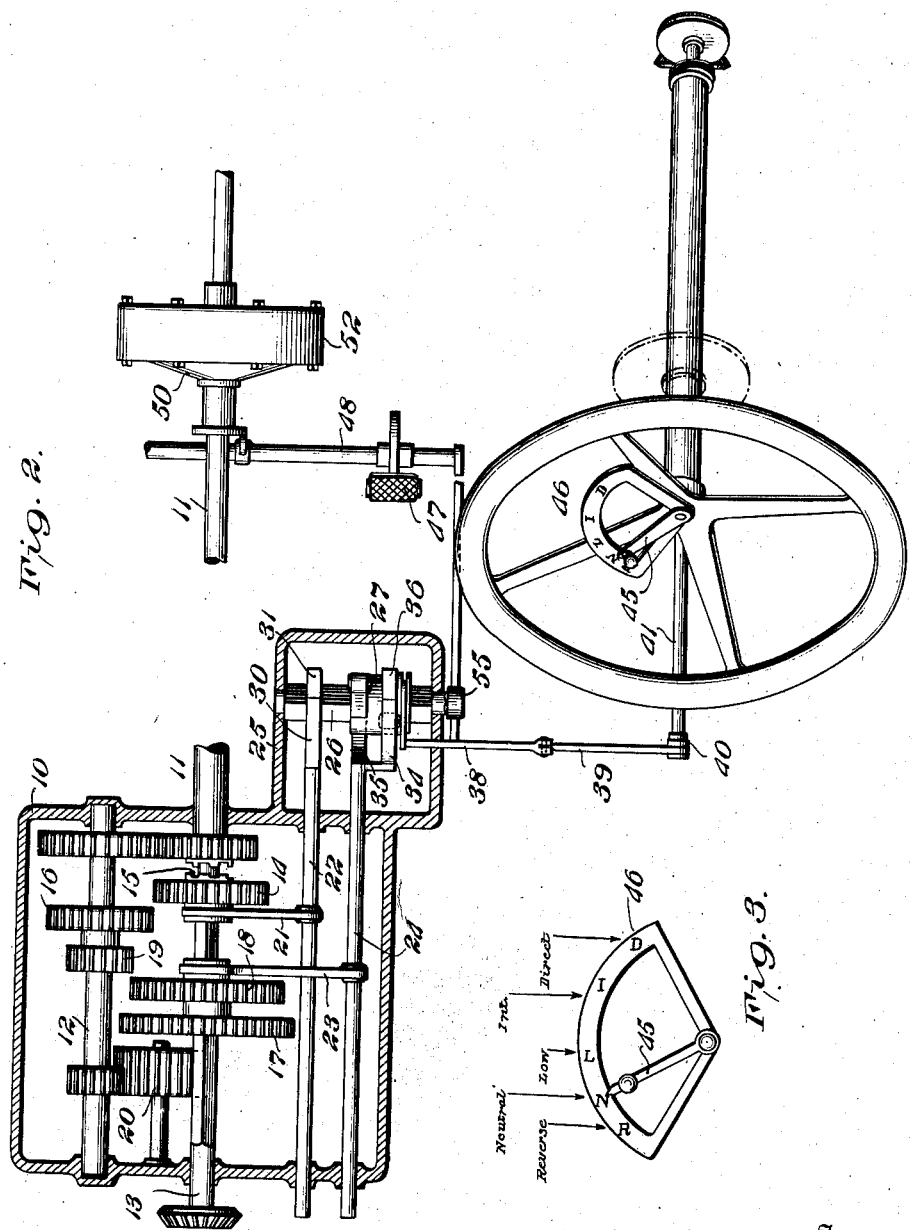

1,025,188.

Patented May 7, 1912.

3 SHEETS—SHEET 3.

Witnesses
J. Adolph Bishop
C. S. Brown

Inventor
William D. Hughs
By Foster Freeman...
Attorneys

UNITED STATES PATENT OFFICE.

WILLIAM D. HUGHS, OF ATLANTA, GEORGIA.

GEARING FOR MOTOR-VEHICLES.

1,025,188.  Specification of Letters Patent.  Patented May 7, 1912.

Application filed March 15, 1911. Serial No. 614,715.

*To all whom it may concern:*

Be it known that I, WILLIAM D. HUGHS, a citizen of the United States, and resident of Atlanta, county of Fulton, State of Georgia, have invented certain new and useful Improvements in Gearing for Motor-Vehicles, of which the following is a specification.

The object of this invention is to provide means whereby the shifting of the transmission gears of a motor vehicle may be controlled by devices located on the steering post or at some other point more convenient to the driver of the vehicle than the levers or other shifting means now generally in use.

The invention may be applied to any of the usual forms of transmission gearing and may be made to control as many different speeds as desired.

In the accompanying drawing, I have shown the invention applied to transmission gearing capable of producing three speeds forward and one reverse speed. The actual shifting of the gears may be effected by power derived from the clutch spring, as illustrated in the form of the invention to be described herein or a special spring may be provided.

Figure 4:
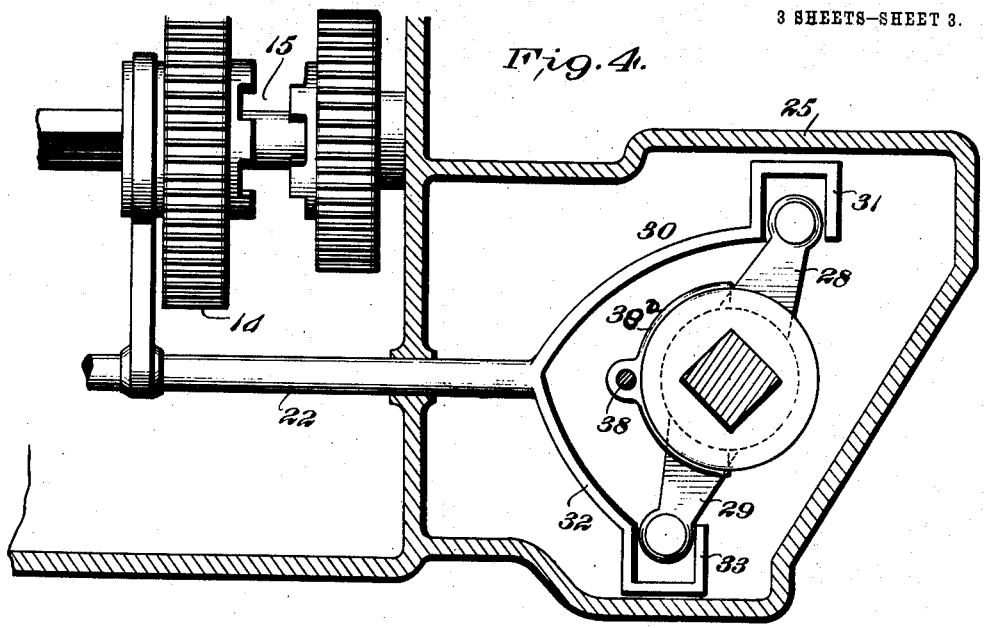
Figure 5:
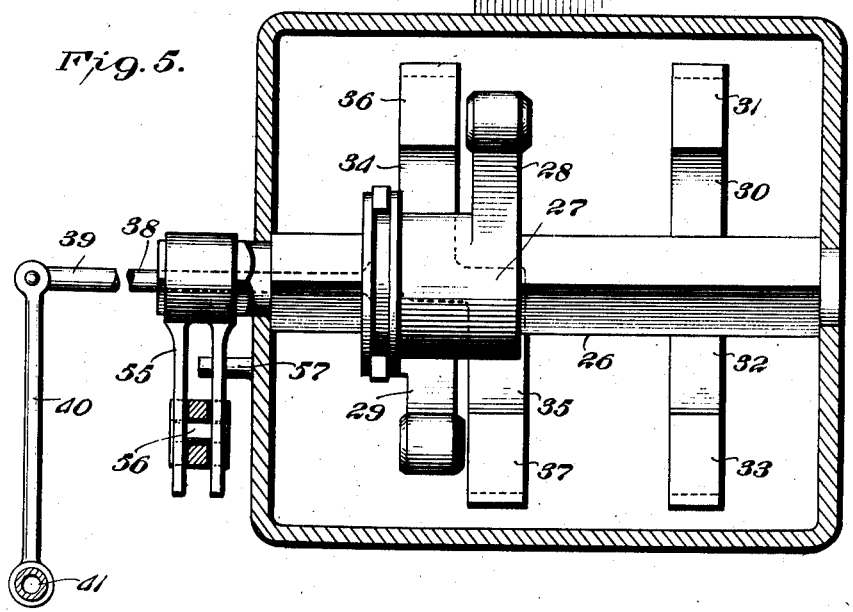

The invention will be more particularly described in connection with the accompanying drawing, in which:

Figure 1 is a sectional view showing in side elevation parts of the steering mechanism, clutch and transmission gearing of an automobile with the present invention incorporated therein. Fig. 1ª is an enlarged view over part of Fig. 1 showing certain parts in two different positions; Fig. 2 is a plan view of the mechanism illustrated in Fig. 1; Fig. 3 is a detail of the indicator of the controlling device; Fig. 4 is a sectional view through the controller case and a part of the transmission gear case; and Fig. 5 is a front elevation of the devices in the controller case.

Referring to the drawing 10 indicates a transmission gear case containing a set of gearing of ordinary construction.

11 indicates a driving shaft, 12 a countershaft and 13 a driven shaft. It will be understood that the shaft 11 is driven by the motor and that the shaft 13 is suitably connected to drive the wheels of the vehicle through the usual differential mechanism. The forward end of the shaft 13 has a bearing in the rear end of the shaft 11. A gear 14 is arranged to slide on and turn with the shaft 13. By moving this gear forward the shaft 13 is connected directly to the shaft 11 by means of the clutch 15, and by moving the gear 14 rearward to mesh with the gear 16 the shaft 13 is driven at an intermediate speed. A pair of gears 17, 18 are arranged to slide on and turn with the shaft 13. By moving these gears forward the gear 18 is brought into mesh with the gear 19 and the shaft 13 is driven at low speed, while by moving the gears 17, 18 rearward the gear 17 is brought into mesh with the constantly rotating reverse gear 20 and the shaft 13 is driven slowly backward. The gear 14 is shifted by an arm 21 on a rod 22 and the gears 17, 18 are shifted by means of an arm 23 on a rod 24. The rods 22 and 24 slide in suitable ways or bearings and they are arranged parallel to the shafts 12 and 13.

All of the mechanism above described is of ordinary construction, and it will be understood that my present invention is applicable to any of the equivalent arrangements of gearing now in common use.

It will be seen that by shifting the rod 22 forward a direct driving is effected, while by shifting it rearward an intermediate speed is obtained and that by shifting the rod 24 forward a low forward speed is obtained, while by shifting it backward a low rearward speed is obtained. I shall now describe the means for shifting these rods, which constitute the novel features of my present invention. The rods 22 and 24 extend into a casing 25 which may be cast integral with the casing 10 or secured thereto in any suitable manner. Within the casing 25 are devices which may be termed a controller for controlling the shifting of the gears. The controller comprises a shaft 26 mounted in suitable bearings and arranged at right angles to the rods 22 and 24. A hub or rocker 27 is arranged to slide on and turn with the shaft 26, the shaft being preferably angular and the hub provided with a corresponding angular opening. On the hub 27 are oppositely directed rocker arms 28, 29 which are preferably staggered or offset from each other for a purpose to be presently described. The forward end of the rod 22, which is located within the controller casing 25, has an upper arm 30 carrying a yoke 31 adapted to receive the end of the arm 28, and a lower arm 32 provided with a yoke 33 adapted to receive the end of the arm 29. The arms 30 and 32 may be in the same plane as illustrated in Fig. 5. The forward end of the rod 24 has upper and lower arms 34, 35 provided respectively with yokes 36, 37, the said arms and yokes being of the same shape and size as those connected with the rod 22, the only difference being that the arms 34, 35 are offset as shown in Fig. 5. The relative arrangement of the rocker arms 28, 29 and the arms of the rods 22, 24 is such that either arm of the rocker can be connected with either of the corresponding arms of the rods 22, 24 at will, but only one connection can be made at a time. It will be evident that this result can be obtained by various arrangements of the rocker arms and the arms of the rods 22, 24, the particular forms of these devices illustrated being but one of many possible arrangements.

The hub or rocker 27 is shifted on the shaft 26 to engage its arms with either of the arms of either of the rods 22, 24 by the following means: A rod 38 extends into the controller casing and is provided with a yoke 38ª which engages a groove in the hub 27. The rod 38 is connected by a link 39 with an arm 40 on a shaft 41 extending forward to the lower end of the steering post 42. The shaft 41 is connected by gears 43 with a shaft 44 extending through the steering post and bearing upon its upper end an arm 45 which constitutes also an indicator of the relative arrangement of the gears in the gear casing. The different positions of the gears may be indicated upon a segment 46 as shown in Figs. 2 and 3. It will be evident that by means of the arm 45 and the connections between said arm and the rocker 27 the rocker may be shifted to any desired position on the shaft 26. The rocker is shown in Fig. 5 in neutral position in which it is out of engagement with all of the arms of the rods 22 and 24. As viewed in Fig. 5 the arm 28 of the rocker will be moved into engagement with the arm 34 by moving the rocker to the left, and the arm 29 will be moved into engagement with the arm 35 by moving the rocker to the right. By continuing the movement of the rocker to the right the arm 28 will first become engaged with the arm 30 of the rod 22, and later the arm 29 will become engaged with the arm 32 of the rod 22. A movement of the rocker to the left (as shown in Fig. 5) will thus be a movement from "neutral" to "reverse," and a movement to the right will bring it successively into the positions for "low", "intermediate", and "high" or "direct". These quoted terms are now well known in the art. The corresponding positions of the arm 45 are indicated by the legends on Fig. 3.

I preferably rock the shaft 26 by power derived from the clutch spring, although it will be evident that a special spring may be provided for this purpose if desired. In the drawings the shaft 26 is shown connected to the clutch in the following manner: The clutch lever or pedal 47 is mounted on a rock shaft 48 provided with an arm 49 which is adapted to move the clutch cone 50 forward when the pedal is depressed. A forward movement of the cone compresses the spring 51 which normally tends to hold the cone in operative connection with the power driven member 52 of the clutch. The rock shaft 48 carries a downwardly directed arm 53 to which is connected a rod 54 extending rearwardly to the controller casing. On the controller rock shaft 26 is an arm 55 which is preferably forked as shown in Fig. 5. The rod 54 has a slot which receives a pin 56 extending through the branches of the arm 55. The arm 55 is provided with a curved portion 55ª which is adapted to coöperate with a head 54ª on the rod 54 in a manner to be presently described.

The operation of my improved means for setting gears of a motor vehicle is as follows: The clutch members 50, 52 are normally in engagement, and the arms 28, 29 of the rocker normally in the position shown in Fig 1. As shown in Figs. 1 and 5 the rocker is in neutral position and not in engagement with any of the connections of the rods 22 and 24. When it is desired to shift the gears the clutch is disengaged by means of the pedal 47, and the rod 54 moved rearward. The rod engages the pin 56 in the arm 55 and swings the arm to the rear, the curved end of the arm moving into engagement with the head 54ª as shown in Fig. 1ª. This movement of the rod is continued until the arm 55 is intercepted by a fixed stop 57. While the arm 55 is in this position the rocker 27 may be shifted to any one of its four operative positions, or to neutral, by means of the indicator arm 45 on the steering post. On releasing the clutch pedal the rod 54 will be drawn back and its head 54ª will positively move the arm 55 until the curved end of the arm moves out of engagement with the head. This will effect the desired shifting of the gears. This movement of the arm 55 and the rock shaft 26 is completed just before the clutch members 50, 52 become engaged. The loose pin-and-slot connection between the rod 54 and the arm 55 permits the clutch members to become fully engaged without further movement of the arm 55, and thus the machine starts on the gear indicated by the selected position of the indicator 45. As shown in Fig. 1ª a stop 58 may be provided for limiting the forward movement of the arm 55 and a spring 59 may be used to hold the arm yieldingly against this stop, and thus to hold the shifting gears yieldingly in any desired position.

By the use of my invention the operator of a motor car can shift the gears without bending down or changing the position which he normally occupies in steering the vehicle. Furthermore the shifting of the gears is accomplished without any effort, especially when the clutch spring is utilized for the purpose, as it is necessary to throw out the clutch when shifting the gears regardless of the form of gear shifting means adopted.

Another advantage of my invention is that the operator may at any time observe the position or adjustment of the gears without bending his body and without taking his eye from the road more than an instant. The feature of being able to shift the gears and to observe the adjustment of the gears without moving the body and practically without taking the eye from the roadway is of great value in operating a motor car in crowded streets and on difficult roads.

Having thus described my invention what I claim as new and desire to secure by Letters-Patent is:

1. In a motor vehicle, a variable speed transmission gearing having an element shiftable in two directions, a device for shifting said element, and a controller arranged to make either of two connections between said device and the shiftable element for moving said element in either of two directions.

2. In a motor vehicle, a variable speed transmission gearing having two shiftable gear elements therein for effecting reverse movement and a plurality of forward speed movements of the vehicle, a device for moving said shiftable gear elements, a controller arranged between said device and said shiftable gear elements and adapted to make either of two connections between said device and either of said shiftable elements, and means for setting said controller in any desired position.

3. In a motor vehicle, a variable speed transmission gearing having an element shiftable in two directions, a spring device for shifting said element, and a controller arranged to make either of two connections between the spring device and the shiftable element for moving said element in either of two directions respectively.

4. In a motor vehicle, a variable speed transmission gearing having a plurality of shiftable elements in combination with a controller, connections between said shiftable elements extending to the controller, means for placing the controller in operative relation to either of said connections, and an indicator to show the relative positions of the controller and said connections.

5. In a motor vehicle, a variable speed transmission gearing having an element shiftable in two directions to effect different speeds, a spring device for moving said shiftable element, a controller for placing the spring device into connection with said shiftable element for moving the same in either direction, a support, and means on the support connected with said controller for setting the same.

6. In a motor vehicle, the combination with transmission gearing embodying a shiftable element for effecting different speeds, of a rod connected with the shiftable element, arms carried by the rod, a rocker shiftable into connection with either of said arms, and means for moving the rocker, for the purpose set forth.

7. In a motor vehicle, the combination with transmission gearing embodying a shiftable element for effecting different speeds, of a rod connected with the shiftable element, arms carried by the rod, a rocker shiftable into connection with either of said arms, means for shifting the rocker into connection with one or other of said arms, and means for turning the rocker to effect a shifting of the movable element.

8. In a motor vehicle, the combination with transmission gearing embodying a shiftable element for effecting different speeds, of a rod connected with the shiftable element, arms carried by the rod, a rocker shiftable into connection with either of said arms, an indicator and connections between the indicator and the rocker for shifting the same into engagement with either of said arms, and a spring device and means for connecting said device with the rocker to turn the same.

9. In a motor vehicle, the combination with a clutch and clutch pedal and with transmission gearing embodying a shiftable element for effecting different speeds, of a rod connected with the shiftable element, arms carried by the rod, a rocker shiftable into connection with either of said arms, an indicator and connections between the indicator and the rocker for shifting the same into engagement with either of said arms, a spring device and means for connecting said device with the rocker to turn the same, and means connecting the clutch pedal with the spring device for compressing the spring when the pedal is operated.

10. In a motor vehicle, a variable speed transmission gearing having two shiftable elements, each shiftable in two directions, a device for shifting said elements, and a controller arranged to make either of two connections between the said device and each shiftable element, whereby either shiftable element may be moved in either of two directions by said device.

11. In a motor vehicle, a variable speed transmission gearing having an element shiftable in two directions to effect two speeds of a vehicle relatively to the engine speed and another element shiftable in two directions to effect a forward and a rearward drive of the vehicle, respectively, a device for shifting said elements, and a controller arranged to make either of two connections between said device and each of said shiftable elements, whereby either shiftable element may be moved in either of two directions by said device.

In testimony whereof I affix my signature in presence of two witnesses.

WILLIAM D. HUGHS.

Witnesses:
  C. A. HUMPHRY,
  GUY T. TABLER.